United States Patent
Kanniappan et al.

(10) Patent No.: US 9,338,396 B2
(45) Date of Patent: May 10, 2016

(54) SYSTEM AND METHOD FOR AFFINITY BASED SWITCHING

(75) Inventors: Senthil K. Kanniappan, San Jose, CA (US); TiongHu Lian, Cupertino, CA (US); Tanu Aggarwal, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 952 days.

(21) Appl. No.: 13/229,451

(22) Filed: Sep. 9, 2011

(65) Prior Publication Data

US 2013/0063544 A1    Mar. 14, 2013

(51) Int. Cl.
  *H04N 7/14*    (2006.01)
  *H04N 7/15*    (2006.01)
  *G06Q 10/10*    (2012.01)

(52) U.S. Cl.
  CPC . *H04N 7/15* (2013.01); *G06Q 10/10* (2013.01)

(58) Field of Classification Search
  USPC ................................. 348/14.01, 14.02, 14.08
  See application file for complete search history.

(56) References Cited

U.S. PATENT DOCUMENTS

| | | | |
|---|---|---|---|
| 6,237,025 B1 | 5/2001 | Ludwig et al. | |
| 8,117,281 B2* | 2/2012 | Robinson | G06F 17/30867 709/217 |
| 8,316,089 B2 | 11/2012 | Thakkar et al. | |
| 8,406,608 B2 | 3/2013 | Dubin et al. | |
| 8,587,634 B1* | 11/2013 | Baldino | H04N 7/15 348/14.08 |
| 2007/0140532 A1* | 6/2007 | Goffin | G06K 9/00288 382/118 |
| 2009/0079815 A1* | 3/2009 | Baird | H04N 7/15 348/14.08 |
| 2009/0079816 A1* | 3/2009 | Qvarfordt et al. | 348/14.16 |
| 2009/0147070 A1* | 6/2009 | Marathe et al. | 348/14.09 |
| 2009/0207233 A1* | 8/2009 | Mauchly | H04N 7/15 348/14.09 |
| 2011/0271332 A1 | 11/2011 | Jones et al. | |
| 2012/0005209 A1* | 1/2012 | Rinearson | G06F 17/30908 707/737 |
| 2012/0200658 A1 | 8/2012 | Duckworth et al. | |
| 2013/0063542 A1 | 3/2013 | Bhat et al. | |

OTHER PUBLICATIONS

USPTO Nov. 7, 2013 Non-Final Office Action from U.S. Appl. No. 13/232,264.
Hans-Peter Dommel, et al., "Floor Control for Multimedia Conferencing and Collaboration," Multimedia Systems © Springer-Verlag (1997) 5: 23-28, 16 pages.
Wensheng Zhou, et al., "On-line knowledge—an rule-based video classification system for video indexing and dissemination," © 2002 Published by Elsevier Science Ltd., 28 pages; http://portal.acm.org/citation.cfm?id=767339.
USPTO Jun. 4, 2014 Final Office Action from U.S. Appl. No. 13/232,264.
USPTO Oct. 8, 2014 Non-Final Office Action from U.S. Appl. No. 13/232,264.

* cited by examiner

*Primary Examiner* — Duc Nguyen
*Assistant Examiner* — Assad Mohammed
(74) *Attorney, Agent, or Firm* — Patent Capital Group (57) ABSTRACT

An example method may include displaying first image data associated with a first participant on a first screen; comparing a first affinity associated with the first participant to a second affinity associated with a second participant; and displaying second image data associated with the second participant on a second screen if the second affinity matches the first affinity. In certain implementations, the first data is displayed as a result of the first participant being an active speaker in a videoconference. The method may also include determining the first affinity and the second affinity based on corresponding uniform resource indicators (URIs) associated with the first affinity and the second affinity.

20 Claims, 7 Drawing Sheets

SYSTEM AND METHOD FOR AFFINITY BASED SWITCHING

TECHNICAL FIELD

This disclosure relates in general to the field of communications and, more particularly, to a system and a method for affinity based switching.

BACKGROUND

Video services have become increasingly important in today's society. Enterprises of varying sizes and types can effectively collaborate through any number of videoconferencing tools. Videoconferencing technology can allow enterprises to cut costs, while boosting productivity within their workforces. Videoconference architectures can deliver real-time, face-to-face interactions between people using advanced visual, audio, and collaboration technologies. Each participant (or group of participants) in a videoconference can operate from a designated location (or a specialized room) to "dial in" and subsequently speak with other participants on one or more screens, as if all participants were in the same room. The ability to offer a personalized videoconference protocol that adequately renders video information presents a significant challenge to network operators, system designers, and hardware developers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method may include displaying first image data associated with a first participant on a first screen; comparing a first affinity associated with the first participant to a second affinity associated with a second participant; and displaying second image data associated with the second participant on a second screen if the second affinity matches the first affinity. In certain implementations, the first data is displayed as a result of the first participant being an active speaker in a videoconference. The method may also include determining the first affinity and the second affinity based on corresponding uniform resource indicators (URIs) associated with the first affinity and the second affinity.

In more detailed instances, the method may include receiving a first URI from the first participant and a second URI from the second participant; accessing a URI table that includes associations between affinities and corresponding URIs; and determining, from the URI table, the first affinity corresponding to the first URI and the second affinity corresponding to the second URI.

In yet other example scenarios, the method may include determining the first affinity of the first participant and the second affinity of the second participant from respective profiles of the first participant and the second participant. Additionally, user preferences are accessed in order to display additional image data associated with other participants of a videoconference. The first participant and the second participant can be identified using a face recognition protocol. In other scenarios, predefined associations between the first participant and the second participant can be stored in a database and used as a basis for displaying particular image data.

Example Embodiments

Figure 1:
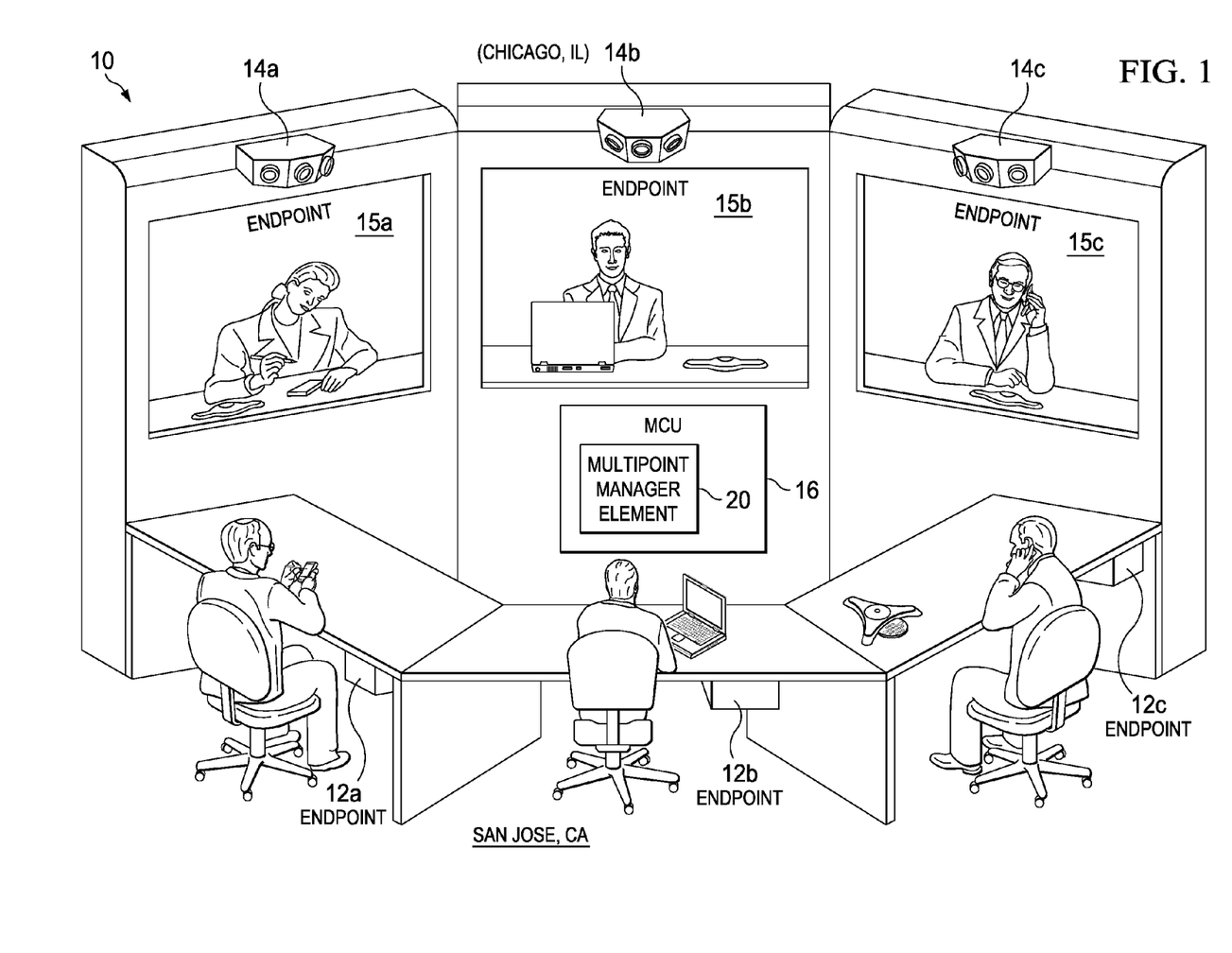
FIG. 1 is a simplified schematic diagram illustrating a system for rendering video data in a conference environment in accordance with one embodiment.

Turning to FIG. 1, FIG. 1 is a simplified schematic diagram illustrating a system 10 for affinity based switching in a videoconferencing environment. FIG. 1 includes multiple endpoints associated with various end users of the videoconference. In general, endpoints may be geographically separated, where in this particular example, endpoints 12a-c are located in San Jose, Calif., while a set of counterparty endpoints are located in Chicago, Ill. FIG. 1 includes a multipoint manager element 20 associated with a multipoint control unit (MCU) 16, which can have any suitable coupling to endpoints 12a-c. Note that the numerical and letter designations assigned to the endpoints of FIG. 1 do not connote any type of hierarchy; the designations are arbitrary and have been used for purposes of teaching only. Such designations should not be construed in any way to limit their capabilities, functionalities, or applications in the potential environments that may benefit from the features of system 10.

In this example, each endpoint is provisioned discreetly along a desk, proximate to its associated participant. Such endpoints could also be provided in any other suitable location, as FIG. 1 only offers one of a multitude of possible implementations for the concepts presented herein. In one example implementation, the endpoints are videoconferencing endpoints, which can be configured to receive and communicate video and audio data. Additionally, each endpoint 12a-c can be configured to interface with a respective multipoint manager element, such as multipoint manager element 20, which can be configured to coordinate and process information being transmitted by the end users.

As illustrated in FIG. 1, a number of cameras 14a-c and screens 15a-c are provided for this particular videoconference. Screens 15a-c can render images to be seen by the end users and, in this particular example, reflect a three-screen design (e.g., a 'triple').

Note that a typical videoconference system is capable of switching the display on a screen based on an active speaker paradigm. As used herein, the term "active speaker" includes any participant who is speaking at a particular moment, or any participant speaking louder than other participants in the videoconference at a particular moment of interest, or alternatively, the loudest (or current) speaker for a certain time duration (e.g., one second, two seconds, etc.). If more than one screen is available, one screen may show the active speaker, and the other screens may randomly show the other participants. The active speaker may see the previous active speaker on one of his/her screens. When a videoconference has participants from multiple locations, each of the participants is not displayed on the screen(s). In such a scenario, participants other than the active speaker may be displayed randomly without forethought as to the preferences of the videoconferencing end users. In essence, participants generally cannot control which participants are shown on the screens.

In some scenarios, a videoconferencing system may use room-based display switching protocols. Participants may engage in a videoconference from one or more rooms, which may be associated with the one or more endpoints in the room. Each endpoint may correspond to a display on a screen, in which case participants associated with the endpoint may be displayed on the screen.

The videoconference system may switch a display from endpoints of a particular room to endpoints of another room during the course of the videoconference. For example, participants associated with endpoints of an active speaker's room may be displayed on screens in other rooms at the same time. If the active speaker changes, displays on screens in the rooms may be switched to show participants associated with endpoints of the new active speaker's room. The screens in the active speaker's room may continue to display participants associated with endpoints of the previous active speaker's room. In other scenarios, a videoconference system may allow a display of each endpoint to be switched independent of the rooms such that at any given time, a room may be viewing participants associated with endpoints of three different rooms (e.g., corresponding to the last three active speakers from the three different rooms). The new active speaker's endpoint is displayed in other rooms, while the screens in the active speaker's room continue to display participants associated with the endpoints corresponding to the previous speakers.

In many meeting settings, current mechanisms for switching displays fail to provide a real-time meeting experience. For example, in a meeting between different companies (e.g., Company A, B, and C), each company may be represented by participants from different sites (or conference rooms). When a participant from one company (e.g., Company A) is an active speaker, the current mechanism may display participants associated with endpoints of the room of the active speaker, or the participants associated with endpoints corresponding to the last few active speakers that may be from various companies. However, it may be preferable to show participants from the active speaker's company (i.e., Company A) on the screens, rather than a random mix of participants from the other companies. For example, the display of other participants from Company A may show whether they agree with the active speaker. In a situation such as a business negotiation, such a feature may be particularly attractive.

System 10 is configured to address these issues (and others) in offering a system and method for affinity based switching in videoconferences. In example embodiments, system 10 can recognize any affinities among participants in a videoconference. As used herein, the broad term "affinity" encompasses any type of user characteristics, or a common interest that links two individuals. Hence, an affinity can include as topical connection (e.g., radio enthusiasts, bloggers, art critics, etc.); an organizational connection (e.g., workers who work at company A, workers in a department, etc.); a hierarchical connection (e.g., supervisors, workers, etc.); a job based connection (e.g., engineers, technicians, advertisers, clerks, lawyers, etc.); an age based connection (e.g., persons between 25 and 35 years of age, Generation X, retirees, etc.); a geographical connection (e.g., participants located in Russia, China, etc.); a technological connection (e.g., employees sharing the same expertise, interests, responsibilities, etc.), and any other suitable characteristic, trade, or commonality shared by various participants. Additionally, the affinity may be associated with a common characteristic relating to a user profile, a URI, a dial in number, an e-mail suffix, a userid, a username, any type of pre-configuration setting (e.g., by an administrator, before a videoconference commences, etc.), any type of predefined setting, any type of user preference, any type of default allocation, or any other suitable characteristic that can correlate two participants.

Participants sharing an affinity may be grouped into a corresponding "affinity group." For example, workers associated with Company A may be grouped into a 'Company A' affinity group. In an example embodiment, with the help of face recognition technology at the endpoints and appropriate user databases, participants can be intelligently grouped into a particular affinity group.

In addition, association indices may be used to characterize (and/or determine) affinity and corresponding affinity groups. Association indices may include uniform resource indicators (URIs), participant identities, user profiles, etc. In an example embodiment, an association index may be a unique dial access number for calling into a videoconference. In another example embodiment, an association index may be a password for participating in a videoconference. Components of system 10 may recognize affinities of the various participants and switch displays appropriately to maintain a multi-screen display that enhances the user experience. Hence, associations between affinities made be developed, where the resultant is displayed (e.g., rendered, projected, illuminated, shown, or otherwise provided) on a particular screen. The actual affinities may be identified using any number of mechanisms, many of which are detailed below (e.g., user profile, URI, dial in number, e-mail suffix, userid, username, etc.). In an example embodiment, a profile for each individual user may be used as a basis for identifying their respective affinity. In yet other instances, affinity and association indices may be predefined in an affinity database, or a local memory.

In operation, system 10 can readily determine affinities of the various participants in the videoconference. Multipoint manager element 20 can receive participant characteristics or information from endpoints and, further, recognize participants (e.g., in each room of the videoconference) using face recognition and other techniques. The characteristics/information may be sent out of band over secure channels, or through any other suitable pathway, channel, medium, etc. Multipoint manager element 20 may create a tree structure that is based on affinity.

System 10 can empower an administrator to control which images are being rendered on a given set of screens, based on affinity determinations. If a participant from a particular affinity group speaks, participants in his or her affinity group may be switched in or shown on appropriate screens 15a-c. The affinity switching technology can be helpful in situations where meeting organizers, administrators, participants, etc. may want to see how the audience from a different affinity group reacts to the meeting.

MCU 16 can be configured to establish, or to foster, a video session between one or more participants, who may be located in various other sites and locations. MCU 16 and multipoint manager element 20 can coordinate and process various policies involving endpoints 12*a-c*. In general, MCU 16 and multipoint manager element 20 may communicate with endpoints 12*a-c* through any standard or proprietary conference control protocol. Multipoint manager element 20 includes a switching component that determines which signals are to be routed to individual endpoints 12*a-c*. Multipoint manager element 20 can also determine how individual participants are seen by other participants in the videoconference based on affinities determined by multipoint manager element 20. Furthermore, multipoint manager element 20 can control the timing and coordination of these activities. Multipoint manager element 20 can also include a media layer that can copy information or data, which can be subsequently retransmitted or simply forwarded along to one or more endpoints 12*a-c*.

Turning to the infrastructure of FIG. 1, the example network environment may be configured as one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Endpoints 12*a-c* are inclusive of devices used to initiate a communication, such as a switch, a console, a proprietary endpoint, a telephone, a bridge, a computer, a personal digital assistant (PDA), a laptop or electronic notebook, an i-Phone, an iPad, a Google Droid, any other type of smartphone, or any other device, component, element, or object capable of initiating voice, audio, video, or data exchanges within system 10. Endpoints 12*a-c* may also be inclusive of a suitable interface to an end user, such as a microphone, a display device, or a keyboard or other terminal equipment. Endpoints 12*a-c* may also include any device that seeks to initiate a communication on behalf of another entity or element, such as a program, a database, or any other component, device, element, or object capable of initiating a voice or a data exchange within system 10. Data, as used herein, refers to any type of video, numeric, voice, or script data, or any type of source or object code, or any other suitable information in any appropriate format that may be communicated from one point to another. Additional details associated with these activities are provided below. Before turning to those discussions, example infrastructure is provided for purposes of explanation and teaching.

Note that as used herein in this specification, the term 'screen' is meant to connote any element that is capable of rendering image data (e.g., any type of video information) during a videoconference. This would necessarily be inclusive of any panel, display device, Telepresence display or wall, computer display, plasma element, television, monitor, or any other suitable surface or element that is capable of such rendering. A screen as used herein also encompasses each window in a "picture in picture" display on a single display device, where multiple videos or images may be displayed simultaneously, for example, in separate adjacent windows, or in one or more inset windows inside a larger window.

The components of system 10 may use specialized applications and hardware to create a system that can leverage a network. System 10 can use Internet protocol (IP) technology and can run on an integrated voice, video, and data network. The system can also support high quality, real-time voice, and video communications using broadband connections. It can further offer capabilities for ensuring quality of service (QoS), security, reliability, and high availability for high-bandwidth applications such as video. Power and Ethernet connections for all end users can be provided. Participants can use their laptops to access data for the meeting, join a meeting place protocol or a Web session, or stay connected to other applications throughout the meeting.

As a general proposition, the videoconference technology of system 10 can be configured to create an in-person meeting experience for its participants. To replicate the conference room experience, the architecture is configured to provide a mechanism for intelligently (and autonomously) rendering images (on videoconference displays) of certain participants, who exude high levels of participation, while pacing the switching decisions on respective affinities. This can better simulate the experience of a conversation that occurs in an actual conference room.

Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. System 10 may include a configuration capable of transmission control protocol/Internet protocol (TCP/IP) communications for the electronic transmission or reception of packets in a network. System 10 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes.

Figure 2:
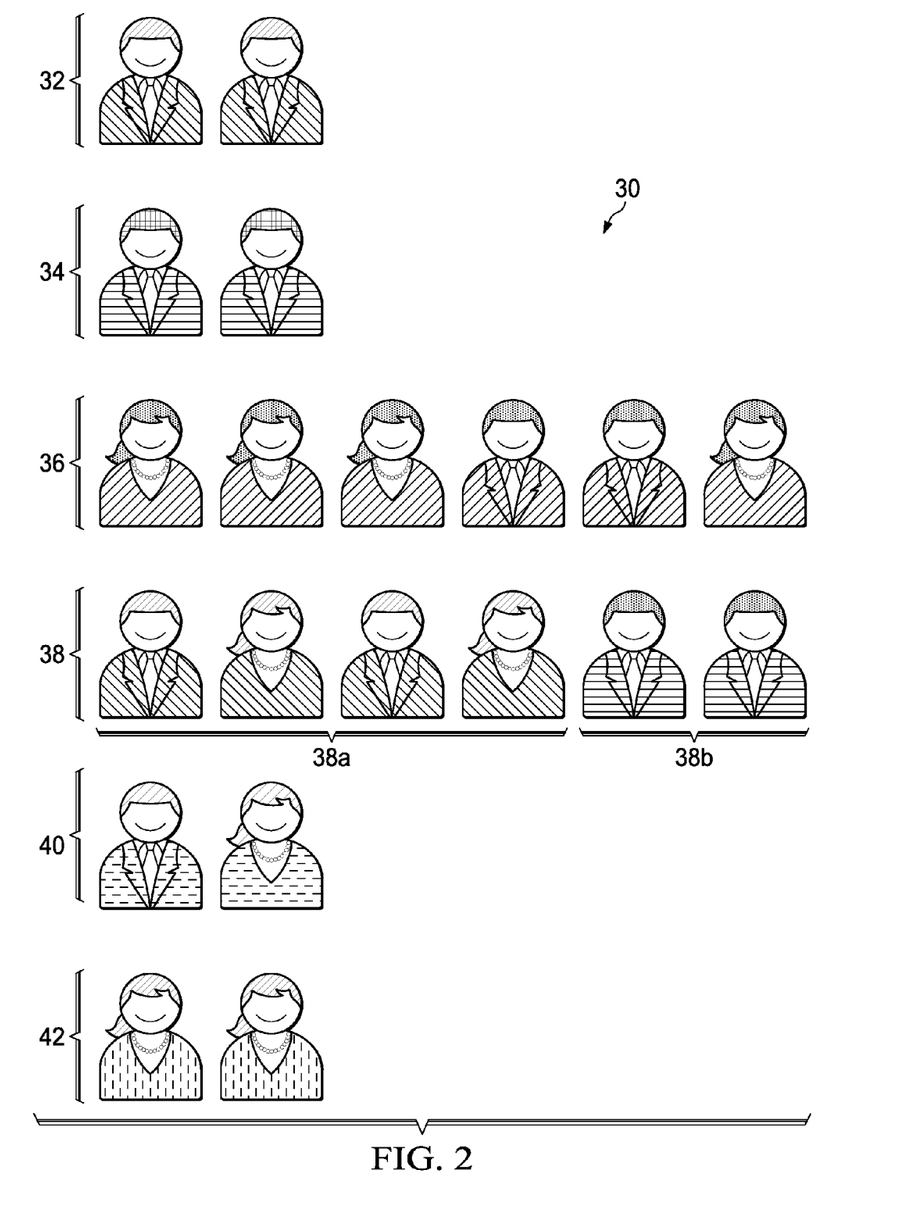
FIG. 2 is a simplified block diagram illustrating example details of the system in accordance with one embodiment.

Turning to FIG. 2, FIG. 2 is a simplified block diagram of example affinity groups in accordance with one embodiment of the present disclosure. A plurality of participants 30 may be grouped into affinity groups based on their respective affinities. For example, participants 32, 38*a*, and 42 may comprise an affinity group A (e.g., supervisors at the same hierarchical level); participants 34 and 38*b* may comprise another affinity group B (e.g., workers in a department); participants 36 may comprise yet another affinity group C (e.g., engineers in India); and participants 38, 40 and 42 may comprise yet another affinity group D (e.g., workers located in the US). Participants may have more than one affinity and, consequently, may belong to more than one affinity group. For example, participants 38 may belong to affinity group A (e.g., participants 38*a*) and affinity group B (e.g., participants 38*b*). Participants may be associated with one or more endpoints, which may be located at the same or different geographical locations. For ease of description and illustrative purposes, an assumption is made that at least two participants are associated with each endpoint.

Figure 3:
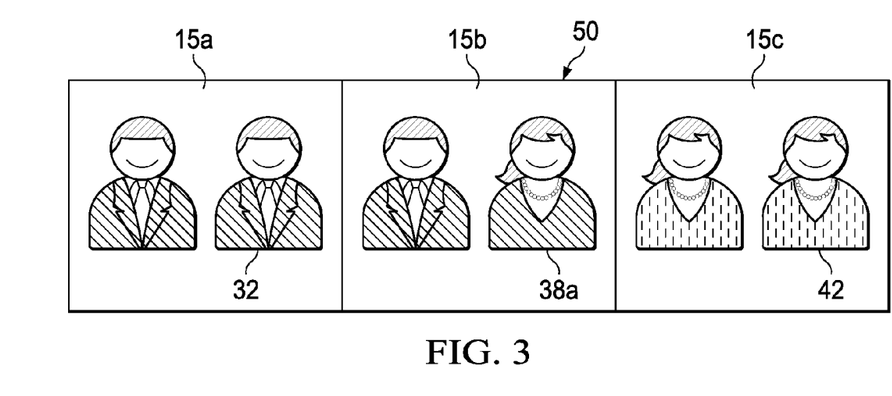
FIG. 3 is a simplified diagram illustrating an example display in accordance with one embodiment.

Turning to FIG. 3, FIG. 3 is a simplified diagram showing an example display 50 in accordance with one embodiment. Assume that one of participants 32 is currently an active speaker in a videoconference. Participants 32 may be associated with affinity group A. Multipoint manager element 20 may recognize that participants 38a and 42 also share the same affinity group A. Multipoint manager element 20 may switch displays in rooms where the videoconference is being conducted to display participants of affinity group A on the screens. According to an example display 50, participants 32 may be shown on screen 15a; participants 38a belonging to affinity group A (e.g., associated with randomly selected endpoints at that location) may be shown on screen 15b; and participants 42 may be shown on screen 15c. Variations of the display shown in FIG. 3 are possible without changing the scope of the present disclosure. For example, participants 32 may be shown on screen 15b, and participants 38a and 42 may be shown on screens 15a and 15c respectively.

In the example shown in FIG. 3, there are three screens present. Additional or less numbers of screens may be provided in any room or geographical location without changing the scope of the present disclosure. If there are a higher number of screens provided, in comparison to endpoints associated with participants of the same affinity group, then multipoint manager element 20 may show the last previous speaker, and/or other participants selected randomly, in the available screens. If there are a lesser number of screens provided, in comparison to the endpoints sharing the same affinity, then multipoint manager element 20 may show the same affinity grouping to each of the affinity group members' available displays.

Figure 4:
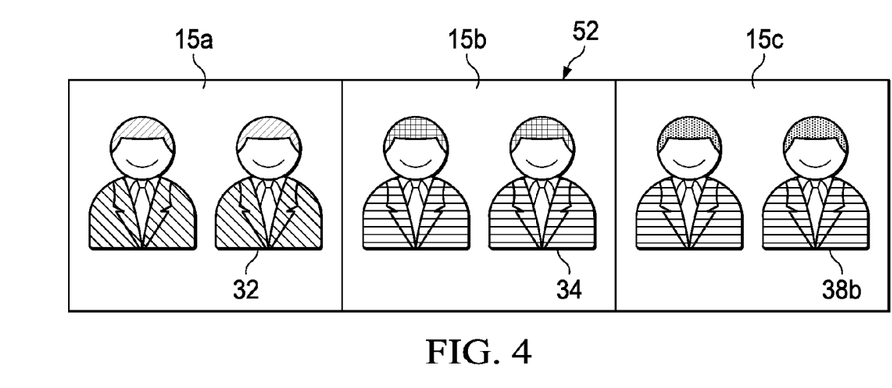
FIG. 4 is a simplified diagram illustrating another example display in accordance with one embodiment.

Turning to FIG. 4, FIG. 4 is a simplified diagram showing another example display 52 in accordance with one embodiment. Assume that one of participants 34 is the active speaker, after one of participants 32 has finished speaking, as described in connection with FIG. 3. Participants 34 may be associated with affinity group B. Multipoint manager element 20 may recognize that participants 38b are also part of the same affinity group B. Multipoint manager element 20 may also recognize that the number of endpoints associated with affinity group B is less than the available number of screens. Multipoint manager element 20 may switch displays in rooms where the videoconference is being conducted to show participants of affinity group B on the screens. Additionally, one of the screens may continue to display the previous active speaker. Display 52 may show participants 32 (e.g., one of whom was the last previous active speaker) on screen 15a as before. Screen 15b may be switched to show participants 34, and screen 15c may be switched to show participants 38b. Variations of the display shown in FIG. 4 are possible without changing the scope of the present disclosure.

Figure 5A:
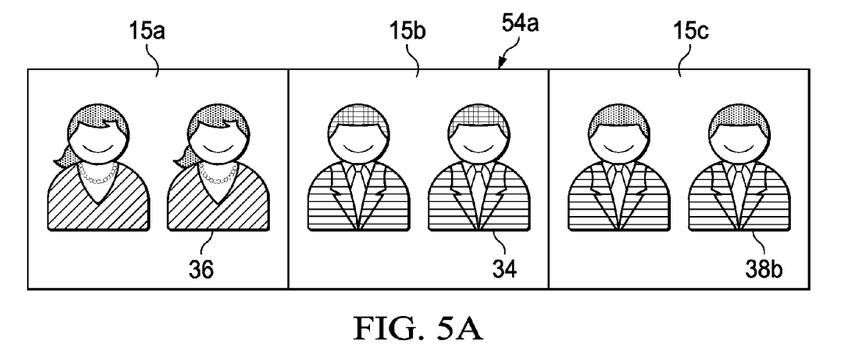
FIG. 5A is a simplified diagram illustrating yet another example display in accordance with one embodiment.
Figure 5B:
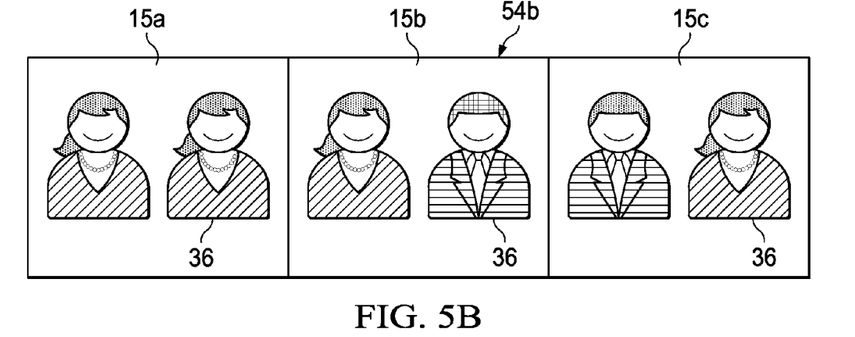
FIG. 5B is a simplified diagram illustrating yet another example display in accordance with one embodiment.

Turning to FIGS. 5A and 5B, FIGS. 5A and 5B are simplified diagrams showing example displays 54a and 54b respectively in accordance with embodiments of the present disclosure. Assume that one of participants 36 is the active speaker after one of participants 34 has finished speaking, as described in connection with FIG. 4. Participants 36 may be associated with affinity group C. Multipoint manager element 20 may recognize that no other locations are associated with affinity group C. Multipoint manager element 20 may switch displays in rooms where the videoconference is being conducted to display participants of affinity group C on the screens. In one embodiment, according to FIG. 5A, display 54a may show participants 34 (e.g., the last previous active speaker) on screen 15b as before. Similarly, screen 15c may continue to show endpoint 38b, and screen 15a may be switched to show participants 36.

In another example embodiment, according to FIG. 5B, display 54b may be switched to show participants 36 on available screens. Thus, according to display 54b, screen 15a may show participants 36 associated with the active speaker's endpoint, and screens 15b and 15c may show the other participants 36 who belong to affinity group C. Variations of the display shown in FIGS. 5A and 5B are possible without changing the scope of the present disclosure.

Figure 6:
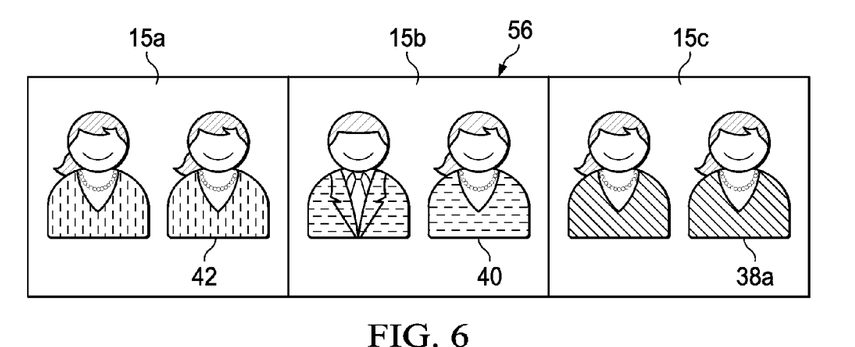
FIG. 6 is a simplified diagram illustrating yet another example display in accordance with one embodiment.

Turning to FIG. 6, FIG. 6 is a simplified diagram showing an example display 56 in accordance with one embodiment. Assume that one of participants 42 is the active speaker after one of participants 36 has finished speaking, as described with reference to FIGS. 5A and 5B. Participants 42 may be associated with affinity group D. Multipoint manager element 20 may recognize that participants 38 and 40 are also part of the same affinity group D. Multipoint manager element 20 may switch displays in rooms where the videoconference is being conducted to show participants of affinity group D on the screens. For example, participants 42 may be shown on screen 15a; screen 15b may be switched to show participants 40; and screen 15c may be switched to show participants 38, for example, randomly selected from endpoints associated with participants 38. In example display 56, participants 38a are shown on screen 15c. Variations of the display shown in FIG. 6 are possible without changing the scope of the present disclosure. For example, screen 15c may show participants 38b.

Figure 7:
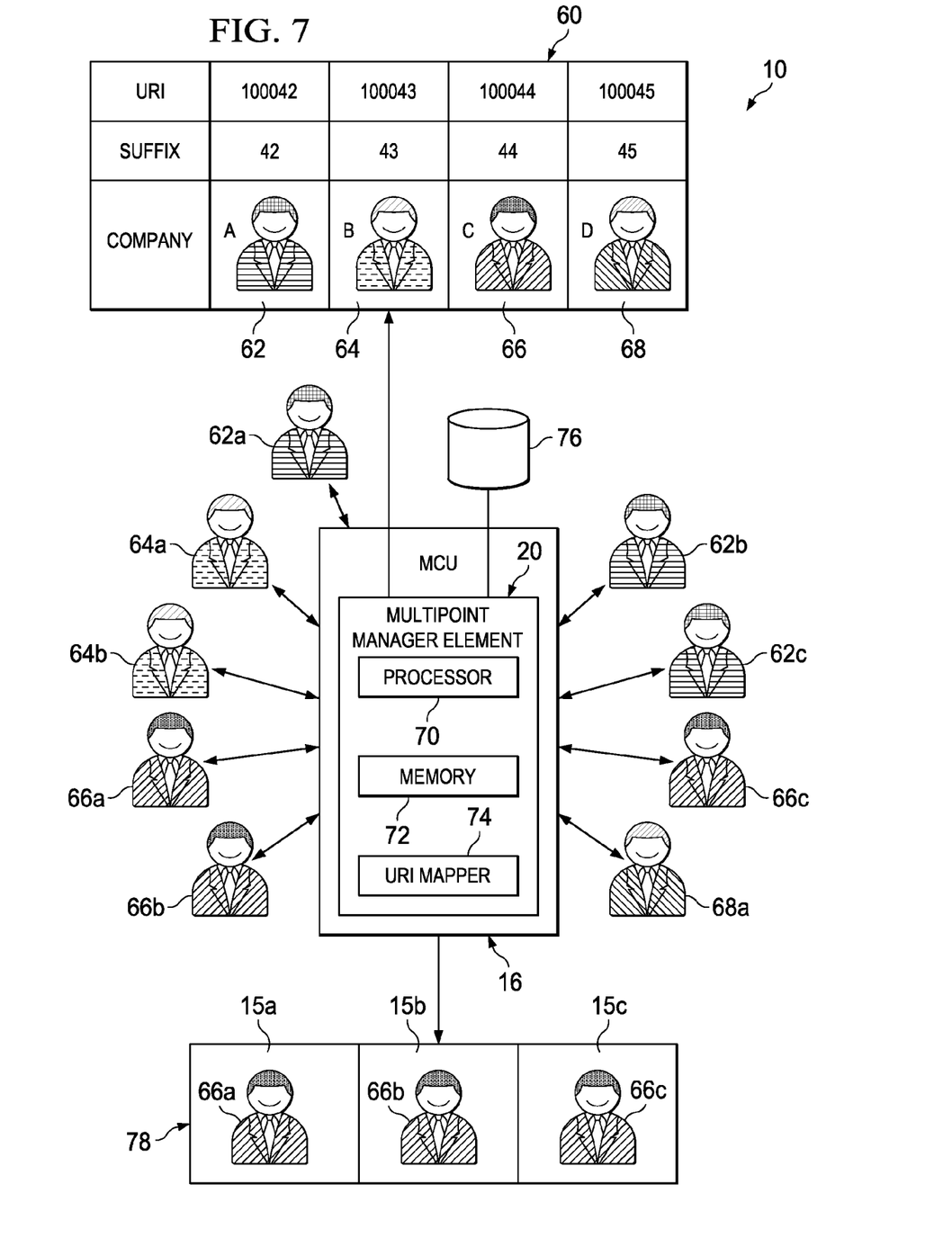
FIG. 7 is a simplified block diagram illustrating an example videoconference system in accordance with one embodiment.

Turning to FIG. 7, FIG. 7 is a simplified block diagram of an example videoconferencing scenario in accordance with one embodiment. According to the embodiment, affinities of participants may be determined from corresponding URIs. For example, affinity groups may be based on companies, which may be assigned unique URIs. Participants in a videoconference who belong to a company may be grouped into an affinity group, and participants who belong to another company may be grouped into another affinity group. According to the example embodiment illustrated in FIG. 7, multipoint manager element 20 associated with MCU 16 may communicate with a URI table 60. Assume that affinity group 62 is based on Company A, affinity group 64 is based on Company B, affinity group 66 is based on Company C, and affinity group 68 is based on Company D. Participants of companies A, B, C, and D may participate in the videoconference. Multipoint manager element 20 may be provisioned with a processor 70, a memory 72, and a URI mapper 74.

In the example embodiment of FIG. 7, a database 76 may be accessible by multipoint manager element 20. Database 76 may be a part of MCU 16, it may be provided in a device in communication with MCU 16 and/or multipoint manager element 20, or it may be provided in any suitable accessible manner based on particular needs. Database 76 may include association indices, affinity histories, pre-determined affinities, affinity group characteristics, identities of participants, information about participating companies, and any other data that may be accessed and/or used by multipoint manager element 20 to perform its functions, as described herein.

URI table 60 may include associations between affinities and corresponding URIs. A URI encompasses a string of characters that can identify a resource (e.g., a participant or an endpoint in a videoconference) on a network. Such a representation may enable identification of the resource by multipoint manager element 20. In the example embodiment according to FIG. 7, the URI is an integer comprising a 6-character string, such as 100042, 100043, 100044, and 100045. The prefix (e.g., a four-character string such as 1000) may identify a particular videoconference (e.g., videoconference number corresponding to a date and session of the videoconference), and a suffix (e.g., a two-character suffix such as 42, 43, 44, 45, etc.) may identify a particular affinity group. However, any format may be used as a URI where appropriate and based on particular needs without departing from the scope of the present disclosure. For example, the URI may be a dial access number, access identifier, phone number, or a website address, etc.

Each affinity group may be associated with a corresponding URI. In the example embodiment according to FIG. 7, affinity group 62, 64, 66, and 68 are associated with URI 100042, URI 100043, URI 100044, and URI 100045, respectively. In one embodiment, URIs may be independent of any characteristics other than predetermined affinity groups. URI table 60 may be provisioned within database 76 or MCU 16, or in a separate device accessible by multipoint manager 20, or in a network element in communication with multipoint manager 20 over a network, or in any other suitable manner based on particular needs.

Affinities of each participant may be determined from corresponding URIs and enforced at the videoconference (e.g., at meeting access time, when participants dial into the videoconference using one of the assigned URIs). In an example embodiment, prior to the videoconference, URI mapper 74 may receive URIs from the participants. In another example embodiment, URI mapper 74 may receive URIs from the participants as they access the meeting and as the videoconference begins. URI mapper 74 may access URI table 60 and determine the affinities corresponding to the URIs received from the participants. URI mapper 74 may then correlate the affinities with respective participants.

In an example embodiment, URI mapper 74 may correlate various participants with their corresponding affinities/affinity groups. In the example embodiment according to FIG. 7, participating companies (e.g., Company A) may be assigned a unique URI (e.g., 100042) based on corresponding affinity groups (e.g., affinity group 62) prior to the videoconference (irrespective of the number of endpoints used by the participating companies). For example, Company A associated with affinity group 62, may include three participants, 62a, 62b, and 62c, who may call in from different locations. Participants 62a-c may be asked to input their respective URIs so that URI mapper 74 may access URI table 60 and appropriately correlate participants 62a and 62b with affinity group 62. In another example, URI mapper 74 may automatically identify their affinity group based on their locations, and/or phone numbers from which they call. Such identifications may be possible based on historical information, predefined associations of affinity groups (or URIs) with the locations and/or phone numbers, or other association indices retrieved by URI mapper 74 from database 76, etc.

Similarly, Company B may include participants 64a and 64b, who may be correlated with corresponding affinity group 64; Company C may include participants 66a-c, who may be correlated with corresponding affinity group 66; and Company D may include participant 68a, who may be correlated with corresponding affinity group 68. Participants may call in from the same or different locations, and may be correlated with corresponding affinity groups by URI mapper 74.

During operation, assume that participant 66a is an active speaker. Multipoint manager element 20 may correlate the active speaker with affinity group 66a and switch the display of screens 15a-c to show other participants belonging to affinity group 66. Thus, display 78 may show active speaker 66a on screen 15a, and participants 66b and 66c on screens 15b and 15c, respectively. Variations of display 78 are possible without changing the scope of the present disclosure. For example, screen 15a may show participant 66c, screen 15b may show active speaker 66a, and screen 15c may show participant 66b.

Figure 8:
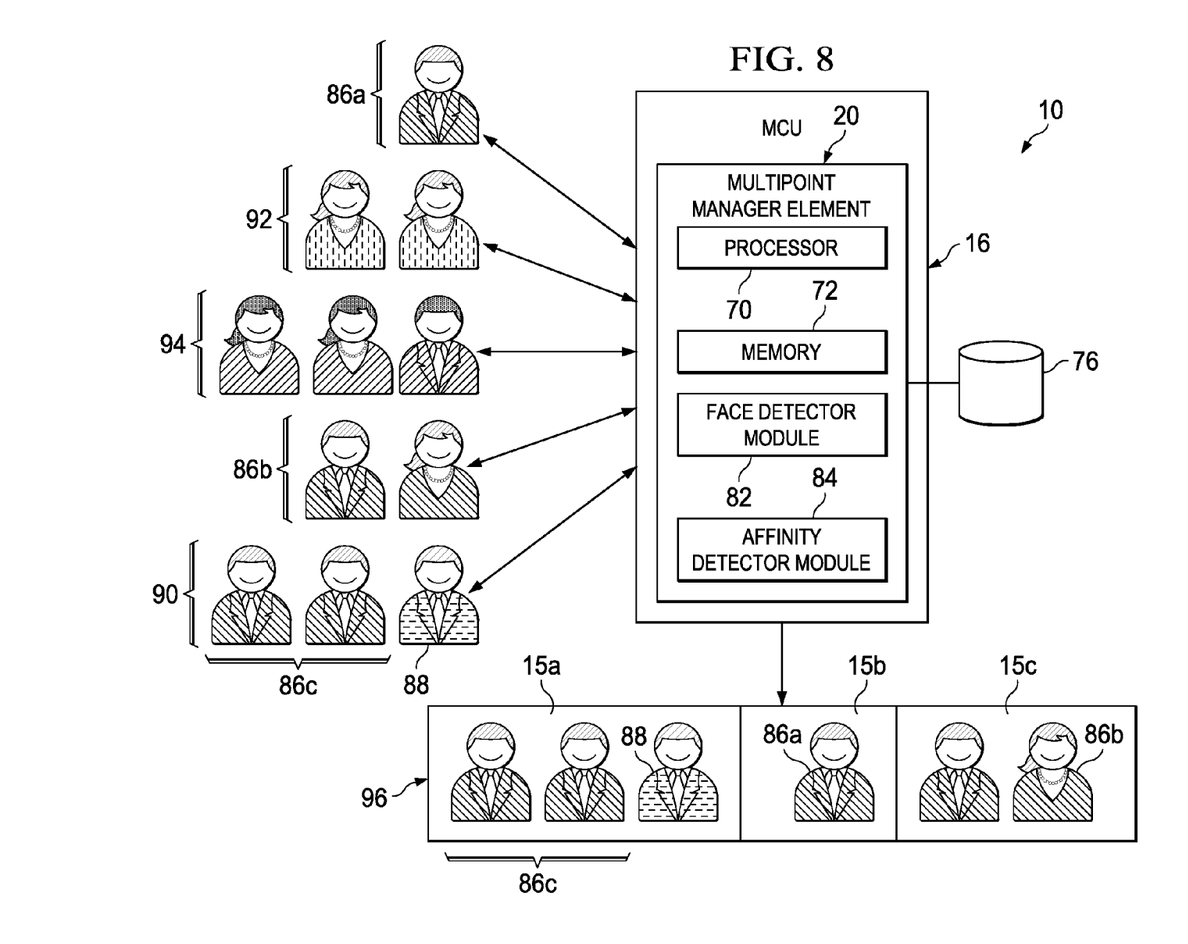
FIG. 8 is a simplified block diagram illustrating another example videoconference system in accordance with one embodiment.

Turning to FIG. 8, FIG. 8 is a simplified block diagram of an example videoconference in accordance with one embodiment. According to the embodiment of FIG. 8, affinities of participants in a videoconference may be determined from their respective identities. For example, participant Alex may be associated with a marketing department constituting a marketing affinity group. Alex may work in a US based office of an organization, and may be associated with a US affinity group. Alex may be a mid-level manager in the marketing department, and may be associated with a mid-level manager affinity group. Thus, a participant identified as Alex may be associated with a marketing affinity group, a US affinity group, and a mid-level manager affinity group.

In the embodiment according to FIG. 8, multipoint manager element 20 may include a face detector module 82 (configured for any suitable facial recognition protocol) and an affinity detector module 84 in addition to processor 70 and memory 72. Multipoint manager element 20 may communicate with database 76, which may be provisioned with predetermined associations between individuals and corresponding affinities (or affinity groups). In an example embodiment, face detector module 82 may be configured to identify the participant and communicate the identification to affinity detector module 84. Face detector module 82 may identify the participants using face recognition techniques. For example, face detector module 82 may employ various algorithms to identify participants based on their facial features. If face detector module 82 is unable to identify a participant by analyzing facial features, alternate algorithms or identification techniques may be implemented, such as keying in or speaking the participant's name, and/or other identifying characteristics to determine the appropriate identities. Any other identification method may be implemented without departing from the broad scope of the present disclosure.

Affinity detector module 84 may access predefined associations between identities and corresponding affinities. In an example embodiment, an administrator may create the predefined associations, for example, manually, or using appropriate tools, and store them in database 76. In another example embodiment, the predetermined associations may be stored on affinity detector module 84. In yet another example embodiment, affinity detector module 84 may run various algorithms or software tools to create the predefined associations from available association indices retrieved from applicable locations, such as database 76. Affinity detector module 84 may determine, from the predefined associations, the respective affinities of the participants.

In an example embodiment, an administrator (or any participant) may choose an affinity category to be used in the videoconference. For example, the administrator may choose affinities based on departments for a particular videoconference. Consequently, affinity detector module 84 may select a department affinity for each participant from the participant's one or more affinities. In another videoconference, the administrator may choose affinities based on locations. Subsequently, affinity detector module 84 may select a location affinity for each participant from the participant's one or more affinities. As participants join a videoconference, they may be identified using face recognition and assigned to an appropriate affinity category for that videoconference session.

According to an embodiment illustrated in FIG. 8, several endpoints may be engaged in a videoconference configured with multipoint manager element 20. When a plurality of participants 86a, 86b, 88-94 call into, or otherwise are included in the videoconference, face detector module 82 may run appropriate algorithms to determine their respective identities. Face detector module 82 may use signals from cameras, microphones, and other detectors to run face recognition algorithms. Affinity detector module 84 may access predefined associations between identities and corresponding affinities to determine that participants 86a, 86b and 86c may belong to affinity group A, participant 88 may belong to affinity group B, participants 90 may belong to affinity group C, affinity group A (e.g., participants 86a) and affinity group B (e.g., participant 88), participants 92 and 94 may belong to affinity group D.

During operation, assume that a participant belonging to affinity group A (e.g., participant 86a) is an active speaker. A display 96 may show the active speaker (e.g., participant 86a) on screen 15b, and other participants of affinity group A (e.g., participants 86b) may be shown on screen 15c. On screen 15a, participants 86c belonging to affinity group A may be shown. If participants 90 are associated with an endpoint, participants 90 may be shown, although participant 88 may belong to another affinity group (e.g., affinity group B).

Figure 9:
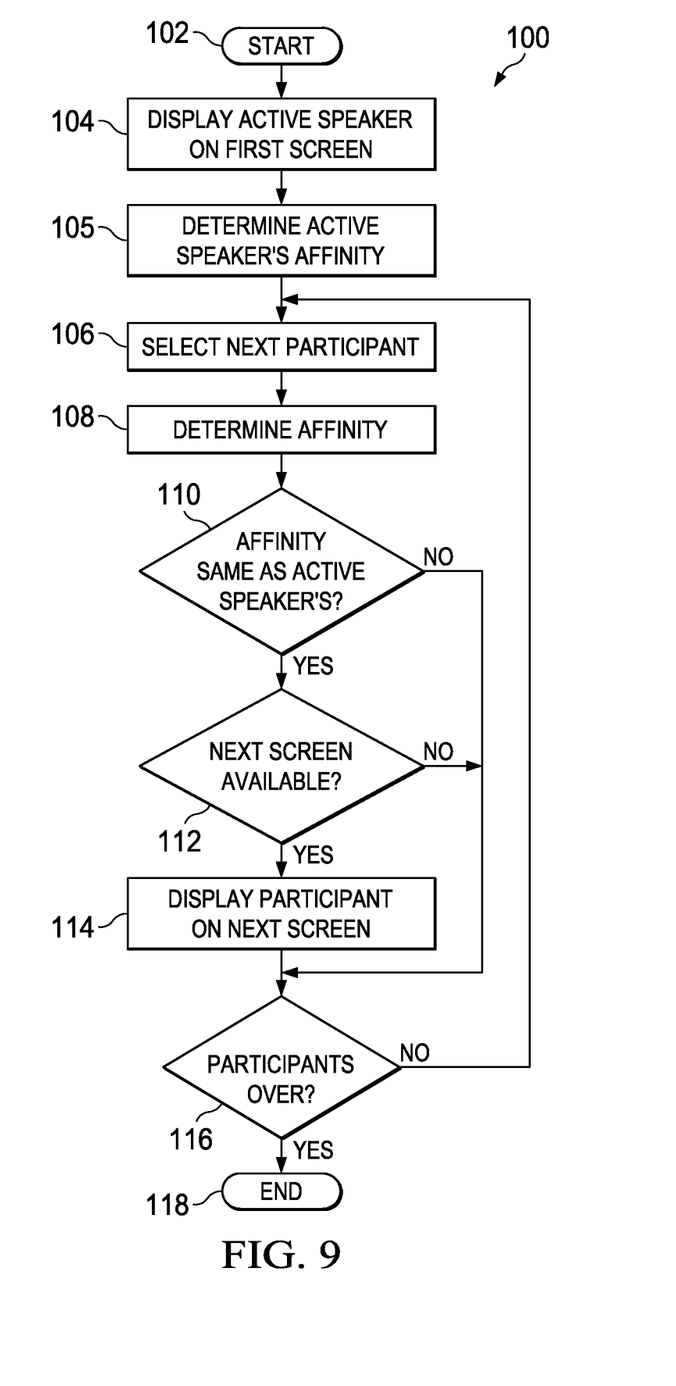
FIG. 9 is a simplified flowchart illustrating example operations associated with an embodiment of the system.

Turning to FIG. 9, FIG. 9 is a simplified flowchart showing example operational activities 100 associated with embodiments of the present disclosure. Embodiments of the present disclosure can switch displays in a videoconference based on affinities of the participants. The particular flow of FIG. 9 may begin at 102, when multipoint manager element 20 is activated. In 104, an active speaker at an endpoint may be displayed on a first screen. In 105, the active speaker's affinity may be determined. In one embodiment, the affinity may be determined from a corresponding URI. In another embodiment, the affinity may be determined from the identity of the active speaker. In 106, a next participant may be selected. In one embodiment, the next participant may be associated with another endpoint of the same room as the active speaker. In another embodiment, the next participant may be associated with another endpoint located in a different geographical location. The next participant may be selected randomly, or selected based on suitable logic, as appropriate. In 108, the next participant's affinity may be determined.

In 110, the affinity of the next participant may be compared to the affinity of the active speaker. If the affinity of the next participant is the same as that of the active speaker, availability of a next screen may be checked in 112. If a next screen is available, the next participant may be displayed on the next screen in 114. On the other hand, if a next screen is not available (as determined in 112), or if the affinity of the next participant is not the same as the affinity of the active speaker (as determined in 110), a determination may be made in 116 whether participants have been included in the affinity determination. If participants are not over (e.g., participants have not been included in the affinity determination), the process may loop back to 106, and a next participant may be selected. On the other hand, if the participants are over (e.g., participants have been included in the affinity determination), the process may end in 118, where similar operations can be repeated for subsequent flows (e.g., when the active speaker changes).

In example implementations, at least some portions of the activities related to affinity based switching outlined herein may be implemented in software in, for example, multipoint manager element 20. In some embodiments, one or more of these features may be implemented in hardware, provided external to these elements, or consolidated in any appropriate manner to achieve the intended functionality. MCU 16 and/or multipoint manager element 20 may include software (or reciprocating software) that can coordinate in order to achieve the operations, as outlined herein. In still other embodiments, these elements may include any suitable algorithms, hardware, software, components, modules, interfaces, or objects that facilitate the operations thereof.

Furthermore, MCU 16 and/or multipoint manager element 20 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory 72) can store data used for the operations described herein. This includes the memory being able to store instructions (e.g., software, logic, code, etc.) that are executed to carry out the activities described in this Specification. A processor can execute any type of instructions associated with the data to achieve the operations detailed herein in this Specification. In one example, processor 70 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 10 can include one or more memory elements (e.g., memory 72) for storing information to be used in achieving operations associated with adaptive optimization of resource utilization for redundancy elimination as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that system 10 of the FIGURES and its teachings are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, system 10 may be applicable to other exchanges or routing protocols. Moreover, although system 10 has been illustrated with reference to particular elements and operations that facilitate the communication process, these elements, and operations may be replaced by any suitable architecture or process that achieves the intended functionality of system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
coordinating image data that is generated on a plurality of screens based on an affinity of an active speaker in a videoconference, wherein the plurality of screens includes at least a first screen, a second screen, and a third screen, and wherein the videoconference includes a plurality of participants;
generating first image data associated with a first participant to display on the first screen, wherein the first participant is the active speaker;
when it is detected that a second participant replaces the first participant as the active speaker:
comparing a second affinity associated with the second participant to each of a plurality of affinities associated with corresponding ones of the plurality of participants to identify which participants of the plurality of participants have the affinity of the active speaker, wherein the second affinity and each of the plurality of affinities comprises a department in a company in which each of the associated participants is employed;
comparing a number of screens in the plurality of screens to a number of endpoints associated with participants having the affinity of the active speaker;
when it is determined that the number of screens is greater than the number of endpoints associated with the participants having the affinity of the active speaker:
maintaining the first image data associated with the first participant on the first screen based on the first participant having most recently been the active speaker, and
generating additional image data associated with at least one of the participants having the affinity of the active speaker to display on each of the second screen and the third screen; and
when it is determined that the number of screens is less than or equal to than the number of endpoints associated with participants having the affinity of the active speaker:
generating the additional image data associated with the at least one of the participants having the affinity of the active speaker to display on each of the first screen, the second screen, and the third screen, wherein the first image data associated with the first participant is replaced by the additional image data.

2. The method of claim 1, further comprising:
determining the first affinity and the second affinity based on corresponding uniform resource indicators (URIs) associated with the first affinity and the second affinity.

3. The method of claim 1, further comprising:
receiving a first URI from the first participant and a second URI from the second participant;
accessing a URI table that includes associations between affinities and corresponding URIs; and determining, from the URI table, the first affinity corresponding to the first URI and the second affinity corresponding to the second URI.

4. The method of claim 1, further comprising:
determining the first affinity of the first participant and the second affinity of the second participant from respective profiles of the first participant and the second participant.

5. The method of claim 1, wherein user preferences are accessed in order to generate additional image data associated with other participants of a videoconference.

6. The method of claim 1, wherein the first participant and the second participant are identified using a face recognition protocol.

7. The method of claim 1, wherein predefined associations between the first participant and the second participant are stored in a database and used as a basis for generating particular image data.

8. Logic encoded in non-transitory media that includes instructions for execution and when executed by a processor operable to perform operations comprising:
coordinating image data that is generated on a plurality of screens based on an affinity of an active speaker in a videoconference, wherein the plurality of screens includes at least a first screen, a second screen, and a third screen, and wherein the videoconference includes a plurality of participants;
generating first image data associated with a first participant to display on the first screen, wherein the first participant is the active speaker;
when it is detected that a second participant replaces the first participant as the active speaker:
comparing a second affinity associated with the second participant to each of a plurality of affinities associated with corresponding ones of the plurality of participants to identify which participants of the plurality of participants have the affinity of the active speaker, wherein the second affinity and each of the plurality of affinities comprises a department in a company in which each of the associated participants is employed;
comparing a number of screens in the plurality of screens to a number of endpoints associated with participants having the affinity of the active speaker;
when it is determined that the number of screens is greater than the number of endpoints associated with the participants having the affinity of the active speaker:
maintaining the first image data associated with the first participant on the first screen based on the first participant having most recently been the active speaker, and
generating additional image data associated with at least one of the participants having the affinity of the active speaker to display on each of the second screen and the third screen; and
when it is determined that the number of screens is less than or equal to than the number of endpoints associated with participants having the affinity of the active speaker:
generating the additional image data associated with the at least one of the participants having the affinity of the active speaker to display on each of the first screen, the second screen, and the third screen, wherein the first image data associated with the first participant is replaced by the additional image data.

9. The logic of claim 8, the operations further comprising:
determining the first affinity and the second affinity based on corresponding uniform resource indicators (URIs) associated with the first affinity and the second affinity.

10. The logic of claim 8, the operations further comprising:
receiving a first URI from the first participant and a second URI from the second participant;
accessing a URI table that includes associations between affinities and corresponding URIs; and
determining, from the URI table, the first affinity corresponding to the first URI and the second affinity corresponding to the second URI.

11. The logic of claim 8, wherein the first participant and the second participant are identified using a face recognition protocol.

12. The logic of claim 8, wherein predefined associations between the first participant and the second participant are stored in a database and used as a basis for generating particular image data.

13. An apparatus, comprising:
a processor; and
a memory coupled to the processor and operable to execute instructions such that the apparatus is configured for:
coordinating image data that is generated on a plurality of screens based on an affinity of an active speaker in a videoconference, wherein the plurality of screens includes at least a first screen, a second screen, and a third screen, and wherein the videoconference includes a plurality of participants;
generating first image data associated with a first participant to display on the first screen, wherein the first participant is the active speaker;
when it is detected that a second participant replaces the first participant as the active speaker:
comparing a second affinity associated with the second participant to each of a plurality of affinities associated with corresponding ones of the plurality of participants to identify which participants of the plurality of participants have the affinity of the active speaker, wherein the second affinity and each of the plurality of affinities comprises a department in a company in which each of the associated participants is employed;
comparing a number of screens in the plurality of screens to a number of endpoints associated with participants having the affinity of the active speaker;
when it is determined that the number of screens is greater than the number of endpoints associated with the participants having the affinity of the active speaker:
maintaining the first image data associated with the first participant on the first screen based on the first participant having most recently been the active speaker, and
generating additional image data associated with at least one of the participants having the affinity of the active speaker to display on each of the second screen and the third screen; and
when it is determined that the number of screens is less than or equal to than the number of endpoints associated with participants having the affinity of the active speaker:
generating the additional image data associated with the at least one of the participants having the affinity of the active speaker to display on each of the first screen, the second screen, and the third screen, wherein the first image data associated with the first participant is replaced by the additional image data.

14. The apparatus of claim 13, wherein the apparatus is further configured for:
   determining the first affinity and the second affinity based on corresponding uniform resource indicators (URIs) associated with the first affinity and the second affinity.

15. The apparatus of claim 13, wherein the apparatus is further configured for:
   receiving a first URI from the first participant and a second URI from the second participant;
   accessing a URI table that includes associations between affinities and corresponding URIs; and
   determining, from the URI table, the first affinity corresponding to the first URI and the second affinity corresponding to the second URI.

16. The apparatus of claim 13, wherein the first participant and the second participant are identified using a face recognition protocol.

17. The apparatus of claim 13, wherein predefined associations between the first participant and the second participant are stored in a database and used as a basis for generating particular image data.

18. The method of claim 1, further comprising:
   determining an affinity of each of the plurality of participants based on a location from which they join the videoconference and a phone number from which they join the videoconference.

19. The logic of claim 8, the operations further comprising:
   determining an affinity of each of the plurality of participants based on a location from which they join the videoconference and a phone number from which they join the videoconference.

20. The apparatus of claim 13, wherein the apparatus is further configured for:
   determining an affinity of each of the plurality of participants based on a location from which they join the videoconference and a phone number from which they join the videoconference.

* * * * *